(Model.)
2 Sheets—Sheet 1.
A. B. CARTER.
APPLE PARER.
No. 288,974. Patented Nov. 27, 1883.
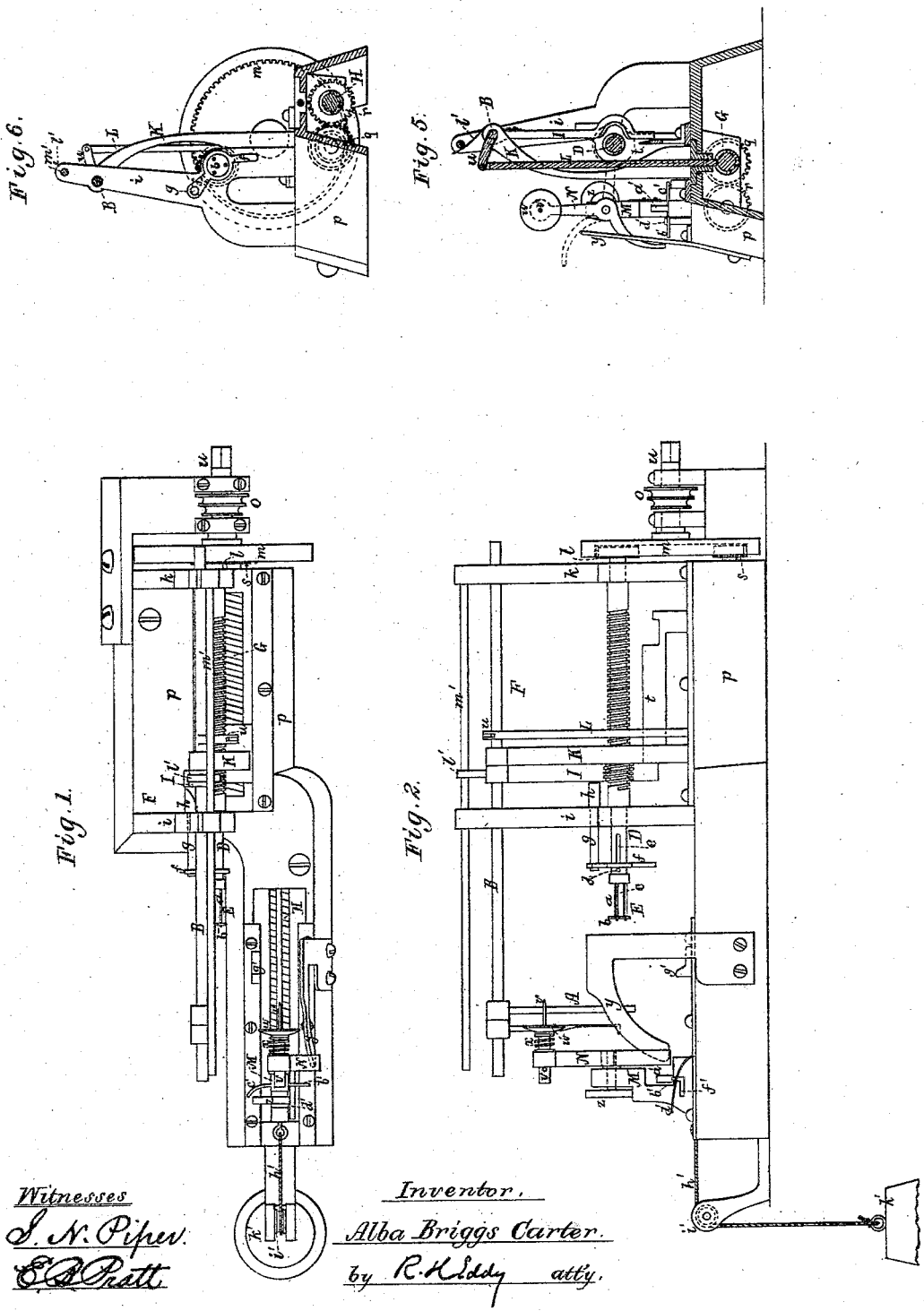
Witnesses
J. N. Piper
E. B. Pratt
Inventor,
Alba Briggs Carter
by R. H. Eddy atty.

(Model.)
A. B. CARTER.
APPLE PARER.
No. 288,974. Patented Nov. 27, 1883.
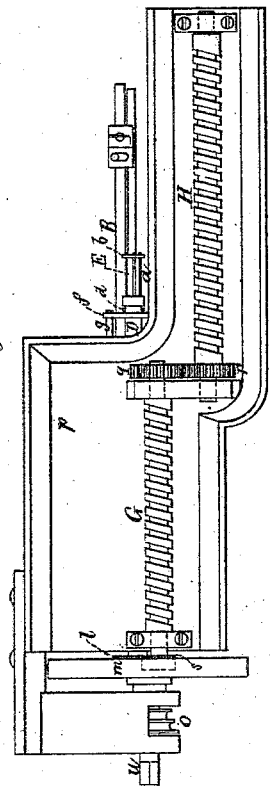
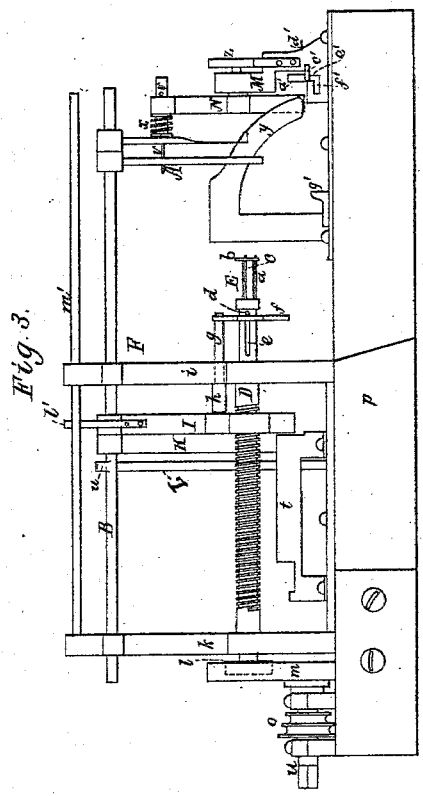
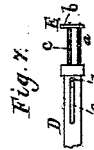
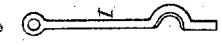
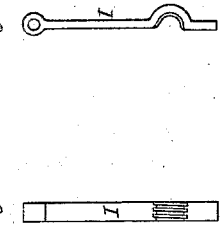
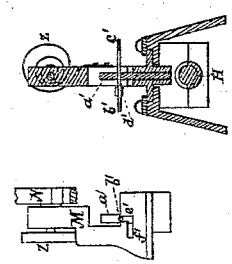
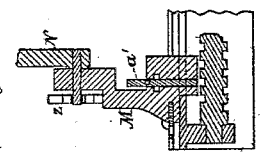
Witnesses.
S. N. Piper
E. P. Pratt
Inventor.
Alba Briggs Carter.
by R. H. Eddy atty.

UNITED STATES PATENT OFFICE.

ALBA B. CARTER, OF RAYMOND, NEW HAMPSHIRE, ASSIGNOR OF ONE-HALF TO CHAS. W. PRESCOTT AND S. P. BLAKE, BOTH OF SAME PLACE.

APPLE-PARER.

SPECIFICATION forming part of Letters Patent No. 288,974, dated November 27, 1883.

Application filed March 19, 1883. (Model.)

*To all whom it may concern:*

Be it known that I, ALBA BRIGGS CARTER, of Raymond, in the county of Rockingham, of the State of New Hampshire, have invented a new and useful Improvement in Fruit or Vegetable Paring Machines; and I do hereby declare the same to be described in the following specification, and represented in the accompanying drawings, of which—

Figure 1 is a top view, Fig. 2 a front elevation, Fig. 3 a rear elevation, and Fig. 4 a bottom view, of a machine embodying my invention, the nature of which is duly defined in the claims hereinafter presented. Figs. 5 and 6 are transverse sections of the machine. Fig. 7 is a side view, and Fig. 8 a longitudinal section, of the fork and cast-off of the paring-machine. Fig. 9 is a front view, and Fig. 10 an edge view of the arm I, hereinafter referred to. Fig. 11 is a longitudinal section, Fig. 12 a front view, and Fig. 13 a transverse section, of the connecting-pin $a'$ and parts adjacent thereto.

In this machine, besides mechanism for automatically paring a fruit or vegetable, there is a mechanism for receiving such fruit or vegetable and automatically transferring it and pressing it upon the fork of the paring mechanism, such transferring mechanism being moved out of the way of the paring mechanism preparatory to the latter performing its duty of paring the fruit.

As my improvement is not in the mechanism for paring the apple or fruit, it is not necessary for me to describe such further than to state that its knife-stock is to be pivoted or properly applied to an arm, A, extending down from a long shaft, B, and is to be constructed and to operate in the usual way. Besides the paring-knife, there may be a slicing-knife, which may extend down from the shaft B, such slicing-knife being to operate in the apple or fruit so as to cut into it spirally and at the same time cut it so as to separate the core portion from the rest of it. The mechanism for paring the apple and that for slicing it and for casting it off the prongs of the shaft for supporting and revolving it while it is being pared and sliced is substantially like that described in an application for a patent filed by me on September 30, 1882, and allowed January 25, 1883.

In the drawings the forked shaft for supporting the apple is shown at D, and its cast-off at E, the shaft having extended from its end a set of prongs, $a$, for receiving the apple. The cast-off consists of a disk, $b$, that slides on the prongs and fastened to a spindle, $c$, which is arranged concentrically in the shaft. A stud, $d$, from the spindle extends through a slot, $e$, made lengthwise in the shaft, all being as shown in Figs. 7 and 8. On the shaft D there is a slide, $f$, from which a rod, $g$, provided with a cam, $h$, extends, as shown. The shaft D is screw-threaded between its supporting-posts $i$ and $k$ of the frame F, for sustaining the main operative parts of the mechanism; and there is fixed on the shaft at its rear end a spur-pinion, $l$, that engages with an internal gear, $m$, fixed on a driving-shaft, $n$, provided with one or more belt-receiving pulleys, $o$.

Below the shaft D, and within the hollow base $p$ of the frame F, there are two other screw-threaded shafts, G and H, which are connected by gears $q$ $r$, the shaft G having a pinion, $s$, to engage with the internal gear, $m$.

From the shaft B there is extended downward an arm, I, which is screw-threaded, to engage with the screw of the shaft D, it being shown particularly in Figs. 9 and 10. There projects upward from the base $p$ a rail, $t$, formed as represented, it being to keep the arm I in engagement with the screw of the shaft D while such may be necessary. A movable post, K, extending downward from the shaft B to the base $p$, is adapted at its base to slide on the base $p$ lengthwise thereof. A rod, L, depending from an arm, $u$, projecting from the shaft B, goes down through the base of the post K, and is to engage with the screw of the shaft G. By means of the arm I and the screw-threaded shaft D, the shaft B is moved rearward, in order to effect the paring of the apple or fruit, the subsequent advance of the shaft B being produced by the post K, the rod L, and the screw-threaded shaft G.

The next part of the mechanism to be described is that for receiving the apple and transferring it to and pressing it upon the prongs $a$ of the shaft D.

To a post, M, adapted to slide in the base $p$ lengthwise thereof, and arranged as represented, there is fulcrumed a lever, N, provided at its upper end with a pin, $v$, carrying a disk, $w$, that rests against a spiral spring, $x$, arranged on the pin and between the lever and the disk. The lower arm of the lever extends across a stationary cam, $y$, formed and arranged as represented, such arm being borne against the cam by the action of a helical spring, $z$, fixed to the post M and to the fulcrum of the lever. The apple, on being forced on the pin $v$, is pressed against the disk $w$, which, by the spring $x$, is allowed to move back while the apple is being forced upon the prongs of the shaft D, particularly when the apple may bring up against the cast-off. Were it not for the disk and spring, the apple would be liable to be accidentally thrown off the pin or to be improperly pressed upon the prongs.

Within the lower part of the post M is a connecting-pin, $a'$, which is adapted to move vertically and to turn horizontally within the post. Arms $b'$ and $c'$ extend in opposite directions from the said connecting-pin, which is pressed upward by a spring, $d'$, attached to the post and bearing against the arm $b'$. Furthermore, the post is slitted vertically, as shown at $e'$, and horizontally, as shown at $f'$, to admit of the vertical and horizontal movements of the two arms $b'$ and $c'$, the latter of said arms being curved, as shown, to enable it to act to advantage against a stationary abutment, $g'$, arranged on and extending upward from the base $p$, in manner as represented.

From the lower part of the post M a rope, $h'$, extends, and, going partly around a pulley, $i'$, arranged as shown, has a weight, $k'$, depending from it.

There may be applied to the arm $b'$ a lever or some other proper device to enable a person to conveniently depress the connecting-pin $a'$ into engagement with the screw of the shaft H; but he can do so by applying his hand directly to the arm $b'$. On doing this the post M will be moved so as to carry the lever N against the cam $y$, which, while the lever continues to so move, will tilt it in a manner to force the pin $v$ down into line with the axis of the shaft D. An apple having been forced upon the pin $v$ by an attendant, he is next to press down the arm $b'$ and move it laterally into the horizontal slot $f'$, so as to cause the connecting-pin $a'$ to enter between the threads of the screw of the shaft H. This shaft being in revolution, the post M and lever N will be moved so as to cause the apple to be moved toward and placed on the prongs of the shaft D, whose cast-off will in the meantime be forced backward by the apple. On the arm C' being moved along and against the abutment $g'$, the connecting-pin $a'$ will be revolved until both the arms $b'$ and $c'$ may be moved out of the horizontal slots $f'$. On this this taking place, the connecting-pin $a'$ will, by the spring $d'$, be forced upward out of engagement with the shaft H. The post and its appurtenances will next, by the weight $k'$, be drawn in the opposite direction or back to place for another apple to be placed on the pin $v$. While the apple is being forced upon the prongs of the shaft D, the slide $f$, with the rod $g$ and cam $h$, will be crowded backward by the stud $d$ of the cast-off E, in consequence of which the cam will operate against and force the arm I toward and into engagement with the screw of the shaft D. This will cause the shaft B to be retracted, so as to bring into action on the apple the paring and slicing mechanism, which takes place while the arm I may be passing against the inner side of the rail $t$. On the arm reaching the rear end of the said rail, a spring, $l'$, fixed to the arm and bearing against a stationary rod, $m'$, arranged as represented, forces the arm laterally off and in advance of the rail, and consequently turns the shaft B so as to cause the rod L to be moved downward into engagement with the screw-shaft H. On this having taken place, the shaft B, with its paring and slicing mechanism, will be advanced, and the arm I will be forced against the end of the cam $h$, and will move it, and of course the slide $f$, forward, so as to produce the necessary advance movement of the cast-off, to cause it to expel the apple from the prongs of the shaft D.

I claim—

1. The combination, with the forked shaft D, for supporting a fruit and revolving it for being pared, of mechanism, substantially as described, for receiving such fruit and automatically transmitting it to and forcing it upon the prongs of such shaft, such mechanism consisting of the screw-threaded shaft H, slotted post M, lever N, pin $v$, cam $y$, connecting-pin $a'$, arms $b'$ $c'$, spring $d'$, abutment $g'$, rope $h'$, and weight $k'$, adapted and to operate as shown and described.

2. The combination of the disk $w$ and spring $x$ with the pin $v$, provided with mechanism for operating it with respect to the paring mechanism, in manner and for the purpose as described.

3. The combination for effecting the reciprocating rectilinear movements of the shaft B of the paring mechanism, such consisting of the internal gear, $m$, the screw-threaded shafts D and H, their pinions $l$ and $s$, the post K, rod L, arm $u$, screw-threaded arm I, rail $t$, slide $f$, rod $g$, cam $h$, spring $l'$, and rod $m'$, all being arranged with the cast-off and adapted to operate substantially as set forth.

ALBA BRIGGS CARTER.

Witnesses:
R. H. EDDY,
E. B. PRATT.